(12) United States Patent
Tibah et al.

(10) Patent No.: US 11,795,328 B2
(45) Date of Patent: Oct. 24, 2023

(54) HARDENING ASPHALT FOR ROOFING APPLICATIONS

(71) Applicant: BMIC LLC, Dallas, TX (US)

(72) Inventors: Denis Tibah, Waxahachie, TX (US); Ramil Marcelo L. Mercado, Waxahachie, TX (US); Kevin Carr, Dallas, TX (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 17/973,277

(22) Filed: Oct. 25, 2022

(65) Prior Publication Data
US 2023/0059632 A1 Feb. 23, 2023

Related U.S. Application Data

(63) Continuation of application No. 17/715,603, filed on Apr. 7, 2022.

(60) Provisional application No. 63/171,750, filed on Apr. 7, 2021.

(51) Int. Cl.
*C08L 95/00* (2006.01)

(52) U.S. Cl.
CPC ............ *C08L 95/00* (2013.01); *C08L 2555/60* (2013.01); *C08L 2555/84* (2013.01); *C08L 2555/86* (2013.01)

(58) Field of Classification Search
None
See application file for complete search history.

(56) References Cited

U.S. PATENT DOCUMENTS

| | | | |
|---|---|---|---|
| 2,485,625 A | 10/1949 | Merley et al. | |
| 7,234,284 B2 | 6/2007 | Paradise et al. | |
| 9,688,882 B2 | 6/2017 | Quinn et al. | |
| 10,030,145 B2 | 7/2018 | Severance et al. | |
| 10,696,868 B2 | 6/2020 | Quinn et al. | |
| 2007/0105986 A1* | 5/2007 | Kluttz | C08L 95/00 524/59 |
| 2010/0147190 A1* | 6/2010 | Naidoo | C08L 91/00 524/69 |

OTHER PUBLICATIONS

Pyshyev et al., "Oil and gas processing products to obtain polymers modified bitumen", International Journal of Pavement Research and Technology 10 (2017) 289-296.

(Continued)

*Primary Examiner* — Colin W. Slifka
(74) *Attorney, Agent, or Firm* — Venable LLP

(57) ABSTRACT

Some embodiments relate to a method comprising one or more of the following steps: obtaining asphalt, obtaining at least one hardening agent, mixing the at least one hardening agent with the asphalt, so as to form a hardened asphalt, obtaining at least one polymer, mixing the at least one polymer with the hardened asphalt, so as to form a polymer modified asphalt, obtaining at least one filler, mixing the at least one filler with at least one of the hardened asphalt, the polymer modified asphalt, or any combination thereof, so as to form a filled coating, obtaining a roofing substrate, and applying the filled coating to the roofing substrate, so as to form a roofing shingle.

20 Claims, 5 Drawing Sheets

(56) References Cited

OTHER PUBLICATIONS

Shved et al., "Study the Possibility of Using Indene-Coumarone Resin with Methacrylate Fragments as Polymer Applications for Petroleum Road Bitumen", International Joint Forum Lea'2018 & YSTCMT'2018, Nov. 22-24, 2018, Lviv, Ukraine, pp. 1-2.
Morris, "Vinyl Plastics: Their Dermatological and Chemical Aspects"; A.M.A. Arch. Ind. Hyg. 5:37-43, Jan. 1952, pp. 535-539.
Wilson et al., "Plastics: The Toxicology of Synthetic Resins", A.M.A. Archives of Industrial Health, vol. 21, Jun. 1960.

* cited by examiner

HARDENING ASPHALT FOR ROOFING APPLICATIONS

CROSS-REFERENCE TO RELATED APPLICATIONS

The present application is a continuation of U.S. patent application Ser. No. 17/715,603, filed Apr. 7, 2022, entitled "Hardening Asphalt for Roofing Applications", which claims priority of U.S. Provisional Patent Application No. 63/171,750, filed Apr. 7, 2021, and entitled "Methods of Hardening Asphalt," the entirety of which are herein incorporated by reference.

FIELD

The present disclosure relates to the field of hardening asphalt for roofing applications.

BACKGROUND

Asphalt requires certain properties to be useful for roofing applications. In some instances, however, the properties of asphalt are not suitable for use in roofing applications.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Some embodiments relate to a method for hardening asphalt. In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the hardened asphalt has a softening point that is 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is 50% to 200% greater than the softening point of the asphalt. In some embodiments, the method comprises obtaining at least one filler. In some embodiments, the method comprises mixing the at least one filler with the PMA, so as to form a filled coating. In some embodiments, the method comprises obtaining a roofing substrate. In some embodiments, the method comprises applying the filled coating to the roofing substrate, so as to form a roofing shingle.

In some embodiments, the asphalt comprises virgin asphalt.

In some embodiments, the asphalt has a softening point of 100° F. to 200° F. as measured according to ASTM D3461.

In some embodiments, the at least one hardening agent comprises at least one of a rosin ester resin, a tall oil resin, any derivative thereof, or any combination thereof.

In some embodiments, the at least one hardening agent has a softening point of 150° F. to 300° F. as measured according to ASTM D3461.

In some embodiments, the at least one hardening agent is mixed with the asphalt in a weight ratio of 1:100 to 1:2.

In some embodiments, the at least one polymer comprises at least one of polystyrene, a styrenic block copolymer, silicone, silicone polyester resin, ethylene vinyl acetate copolymer, or any combination thereof. Some embodiments relate to a method for hardening asphalt. In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form hardened asphalt. In some embodiments, the hardened asphalt has a softening point that is from 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is from 50% to 200% greater than the softening point of the asphalt. In some embodiments, the PMA does not comprise a plasticizer. In some embodiments, the method comprises obtaining at least one filler. In some embodiments, the method comprises mixing the at least one filler with the PMA, so as to form a filled coating. In some embodiments, the filled coating is configured to be applied to a roof substrate to obtain a roofing shingle.

In some embodiments, the asphalt comprises virgin asphalt.

In some embodiments, the asphalt has a softening point of 100° F. to 200° F. as measured according to ASTM D3461.

In some embodiments, the at least one hardening agent comprises at least one of a rosin ester resin, a tall oil resin, any derivative thereof, or any combination thereof.

In some embodiments, the at least one hardening agent has a softening point of 150° F. to 300° F. as measured according to ASTM D3461.

In some embodiments, the at least one hardening agent is mixed with the asphalt in a weight ratio of 1:100 to 1:2.

In some embodiments, the at least one polymer comprises at least one of polystyrene, a styrenic block copolymer, silicone, silicone polyester resin, ethylene vinyl acetate copolymer, or any combination thereof.

Some embodiments relate to a method for hardening asphalt. In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form hardened asphalt. In some embodiments, the hardened asphalt has a softening point that is from 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is from 50% to 200% greater than the softening point of the asphalt. In some embodiments, the method comprises obtaining at least one filler. In some embodiments, the method comprises mixing the at least one filler with the PMA, so as to form a filled coating. In some embodiments, the filled coating is configured to be applied to a roof substrate to obtain a roofing shingle.

In some embodiments, the asphalt comprises virgin asphalt.

In some embodiments, the asphalt has a softening point of 100° F. to 200° F. as measured according to ASTM D3461.

In some embodiments, the at least one hardening agent comprises at least one of a rosin ester resin, a tall oil resin, any derivative thereof, or any combination thereof.

In some embodiments, the at least one hardening agent has a softening point of 150° F. to 300° F. as measured according to ASTM D3461.

In some embodiments, the at least one hardening agent is mixed with the asphalt in a weight ratio of 1:100 to 1:2.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
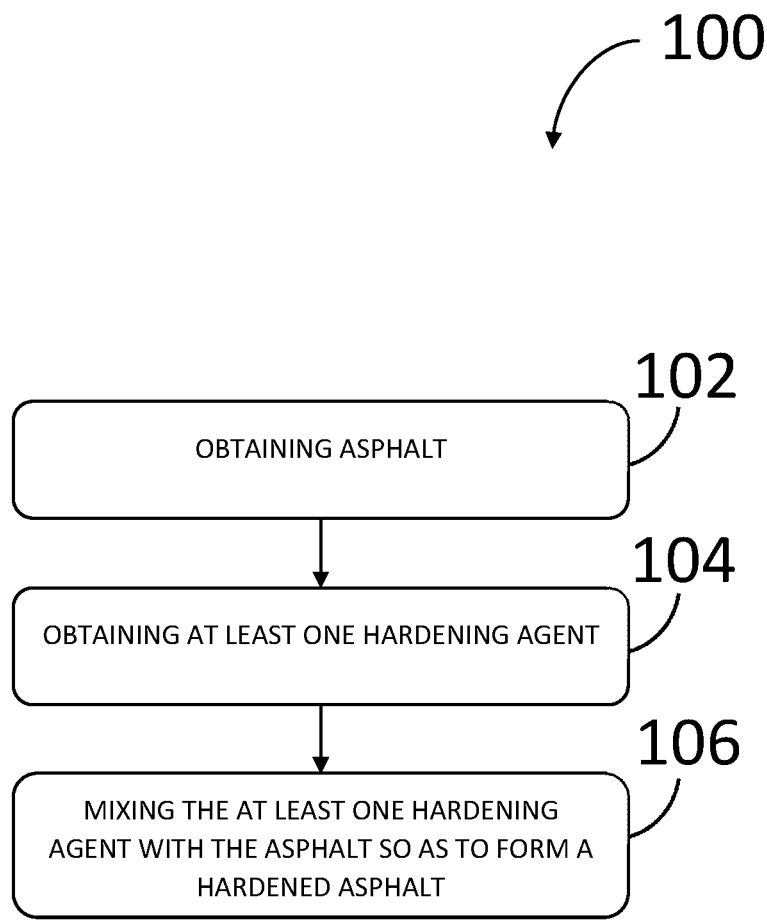
FIG. 1 depicts a non-limiting embodiment of a method of hardening asphalt, according to some embodiments.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, terms such as "comprising," "including," and "having" do not limit the scope of a specific claim to the materials or steps recited by the claim.

All prior patents, publications, and test methods referenced herein are incorporated by reference in their entireties.

As used herein, "softening point" refers to the temperature at which asphalt softens as measured according to ASTM D3461.

As used herein, "hardening agent" refers to a material that, when mixed with asphalt, is configured to cause the asphalt to harden, so as to form a hardened asphalt. In some embodiments, the hardening agent may be configured to cause the asphalt to harden, so as to form a hardened asphalt having a softening point that is 10% to 100% greater than the softening point of the asphalt.

As used herein, "oxidation step" refers to the process of exposing asphalt to oxygen, so as to alter at least one property of the asphalt.

As used herein, "asphalt" refers to any form of asphalt that is not obtained from asphalt waste. Examples of asphalt include virgin asphalt, such as, without limitation, at least one of hot mix asphalt, warm mix asphalt, cold mix asphalt, sheet asphalt, high-modulus asphalt, or any combination thereof. In some embodiments, the asphalt comprises oxidized asphalt (e.g., oxidized virgin asphalt). In some embodiments, the asphalt comprises unoxidized asphalt (e.g., unoxidized virgin asphalt).

As used herein, "hardening agent" refers to a material for modifying a rheology of asphalt.

As used herein, "polymer modified asphalt" (PMA) refers to a form of processed asphalt that is created by adding at least one polymer to asphalt. In some embodiments, a polymer modification procedure comprises emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In some embodiments, the polymer forms at least one of a colloid suspension with the asphalt, colloid solution with the asphalt, dispersion with the asphalt, or any combination thereof.

Some embodiments relate to a method. In some embodiments, the method comprises one or more of the following steps: obtaining asphalt; obtaining at least one hardening agent; mixing the at least one hardening agent with the asphalt, so as to form a hardened asphalt; obtaining at least one polymer; mixing the at least one polymer with the hardened asphalt, so as to form a polymer modified asphalt; obtaining at least one filler; mixing the at least one filler with at least one of the hardened asphalt, the polymer modified asphalt, or any combination thereof, so as to form a filled coating; obtaining a roofing substrate; and applying the filled coating to the roofing substrate, so as to form a roofing shingle. In some embodiments, the method is useful for forming a hardened asphalt. In some embodiments, the method is useful for forming a polymer modified asphalt. In some embodiments, the method is useful for forming a filled coating. In some embodiments, the method is useful for forming a roofing shingle.

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the hardened asphalt has a softening point that is 10% to 100% greater than the softening point of the asphalt.

In some embodiments, the method comprises obtaining virgin asphalt. In some embodiments, the virgin asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the virgin asphalt, so as to form a hardened asphalt. In some embodiments, the hardened asphalt has a softening point that is 10% to 100% greater than the softening point of the virgin asphalt. In some embodiments, the method does not comprise an oxidation step.

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the hardened asphalt has a softening point that is 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA).

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the at least one hardening agent is mixed with the asphalt in a weight ratio of 1:100 to 1:2. In some embodiments, the hardened asphalt has a softening point that is 10% to 100% greater than the softening point of the asphalt.

In some embodiments, the method comprises obtaining an unoxidized virgin asphalt. In some embodiments, the unoxidized virgin asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the unoxidized virgin asphalt, so as to form a hardened asphalt. In some embodiments, the at least one hardening agent is mixed with the unoxidized virgin asphalt in a weight ratio of 1:100 to 1:2. In some embodiments, the hardened asphalt has a softening point that is 10% to 100% greater than the softening point of the unoxidized virgin asphalt. In some embodiments, the method does not comprise an oxidation step.

In some embodiments, the method comprises obtaining asphalt. In some embodiments, the asphalt has a softening point of at least 100° F. as measured according to ASTM D3461 In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the hardened asphalt has a softening point that is 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is 50% to 200% greater than the softening point of the asphalt. In some embodiments, the PMA does not comprise a plasticizer.

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form a hardened asphalt. In some embodiments, the hardened asphalt has a softening point that is 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is 50% to 200% greater than the softening point of the asphalt. In some embodiments, the method comprises obtaining at least one filler. In some embodiments, the method comprises mixing the at least one filler with the PMA, so as to form a filled coating. In some embodiments, the method comprises obtaining a roofing substrate. In some embodiments, the method comprises applying the filled coating to the roofing substrate, so as to form a roofing shingle.

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form hardened asphalt. In some embodiments, the hardened asphalt has a softening point that is 10% to 100% greater than the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is 50% to 200% greater than the softening point of the asphalt. In some embodiments, the PMA does not comprise a plasticizer. In some embodiments, the method comprises obtaining at least one filler. In some embodiments, the method comprises mixing the at least one filler with the PMA, so as to form a filled coating. In some embodiments, the filled coating is configured to be applied to a roof substrate to obtain a roofing shingle.

In some embodiments, the method comprises obtaining asphalt. In some embodiments, the asphalt has a softening point of at least 100° F. as measured according to ASTM D3461. In some embodiments, the method comprises obtaining at least one hardening agent. In some embodiments, the at least one hardening agent has a softening point of at least 150° F. as measured according to ASTM D3461. In some embodiments, the method comprises mixing the at least one hardening agent with the asphalt, so as to form hardened asphalt. In some embodiments, the hardened asphalt has a softening point that is 10% to 100% greater than the softening point of the asphalt. In some embodiments, the method comprises obtaining at least one polymer. In some embodiments, the method comprises mixing the at least one polymer with the hardened asphalt, so as to form a polymer modified asphalt (PMA). In some embodiments, the PMA has a softening point that is from 50% to 200% greater than the softening point of the asphalt. In some embodiments, the method comprises obtaining at least one filler. In some embodiments, the method comprises mixing the at least one filler with the PMA, so as to form a filled coating. In some embodiments, the filled coating is configured to be applied to a roof substrate to obtain a roofing shingle.

Some embodiments relate to a hardened asphalt, including for example and without limitation, a hardened asphalt formed according to any of the methods disclosed herein. Some embodiments relate to a polymer modified asphalt, including for example and without limitation, a polymer modified asphalt formed according to any of the methods disclosed herein. Some embodiments relate to a filled coating, including for example and without limitation, a filled coating formed according to any of the methods disclosed herein. Some embodiments relate to a roofing shingle, including for example and without limitation, a roofing shingle formed according to any of the methods disclosed herein.

In some embodiments, the method comprises obtaining asphalt. In some embodiments, the asphalt has a softening point of at least 100° F. as measured according to ASTM D3461. In some embodiments, the asphalt has a softening point of 100° F. to 200° F. In some embodiments, the asphalt has a softening point of 110° F. to 200° F. In some embodiments, the asphalt has a softening point of 120° F. to 200° F. In some embodiments, the asphalt has a softening point of 130° F. to 200° F. In some embodiments, the asphalt has a softening point of 140° F. to 200° F. In some embodiments, the asphalt has a softening point of 150° F. to 200° F. In some embodiments, the asphalt has a softening point of 160° F. to 200° F. In some embodiments, the asphalt has a softening point of 170° F. to 200° F. In some embodiments, the asphalt has a softening point of 180° F. to 200° F. In some embodiments, the asphalt has a softening point of 190° F. to 200° F. In some embodiments, the asphalt has a softening point of 100° F. to 190° F. In some embodiments, the asphalt has a softening point of 100° F. to 180° F. In some embodiments, the asphalt has a softening point of 100° F. to 170° F. In some embodiments, the asphalt has a softening point of 100° F. to 160° F. In some embodiments, the asphalt has a softening point of 100° F. to 150° F. In some embodiments, the asphalt has a softening point of 100° F. to 140° F. In some embodiments, the asphalt has a softening point of 100° F. to 130° F. In some embodiments, the asphalt has a softening point of 100° F. to 120° F. In some embodiments, the asphalt has a softening point of 100° F. to 110° F. In some embodiments, the asphalt has a softening point of 110° F. to 190° F. In some embodiments, the asphalt has a softening point of 120° F. to 180° F. In some embodiments, the asphalt has a softening point of 130° F. to 170° F. In some embodiments, the asphalt has a softening point of 140° F. to 160° F. In some embodiments, the softening point of the asphalt is measured according to ASTM D3461.

In some embodiments, the asphalt has a viscosity of 5 cP to 125 cP. In some embodiments, the asphalt has a viscosity of 10 cP to 125 cP. In some embodiments, the asphalt has a viscosity of 25 cP to 125 cP. In some embodiments, the asphalt has a viscosity of 40 cP to 125 cP. In some embodiments, the asphalt has a viscosity of 55 cP to 125 cP. In some embodiments, the asphalt has a viscosity of 70 cP to 125 cP. In some embodiments, the asphalt has a viscosity of 85 cP to 125 cP. In some embodiments, the asphalt has a viscosity of 100 cP to 125 cP. In some embodiments, the asphalt has a viscosity of 115 cP to 125 cP. In some embodiments, the asphalt has a viscosity of 10 cP to 110 cP. In some embodiments, the asphalt has a viscosity of 10 cP to 95 cP. In some embodiments, the asphalt has a viscosity of 10 cP to 80 cP. In some embodiments, the asphalt has a viscosity of 10 cP to 65 cP. In some embodiments, the asphalt has a viscosity of 10 cP to 50 cP. In some embodiments, the asphalt has a viscosity of 10 cP to 35 cP. In some embodiments, the asphalt has a viscosity of 10 cP to 20 cP. In some embodiments, the asphalt has a viscosity of 25 cP to 110 cP. In some embodiments, the asphalt has a viscosity of 40 cP to 95 cP. In some embodiments, the asphalt has a viscosity of 55 cP to 80 cP. In some embodiments, the viscosity of the asphalt is measured at 400° F. according to ASTM D4402.

In some embodiments, the asphalt has a penetration of 0 dmm. In some embodiments, the asphalt has a penetration of 0.1 dmm to 225 dmm. In some embodiments, the asphalt has a penetration of 0.1 dmm to 225 dmm. In some embodiments, the asphalt has a penetration of 20 dmm to 225 dmm. In some embodiments, the asphalt has a penetration of 40 dmm to 225 dmm. In some embodiments, the asphalt has a penetration of 60 dmm to 225 dmm. In some embodiments, the asphalt has a penetration of 80 dmm to 225 dmm. In some embodiments, the asphalt has a penetration of 100 dmm to 225 dmm. In some embodiments, the asphalt has a penetration of 120 dmm to 225 dmm. In some embodiments, the asphalt has a penetration of 140 dmm to 225 dmm. In some embodiments, the asphalt has a penetration of 160 dmm to 225 dmm. In some embodiments, the asphalt has a penetration of 180 dmm to 225 dmm. In some embodiments, the asphalt has a penetration of 200 dmm to 225 dmm. In some embodiments, the asphalt has a penetration of 0.1 dmm to 220 dmm. In some embodiments, the asphalt has a penetration of 0.1 dmm to 210 dmm. In some embodiments, the asphalt has a penetration of 0.1 dmm to 200 dmm. In some embodiments, the asphalt has a penetration of 0.1 dmm to 180 dmm. In some embodiments, the asphalt has a penetration of 0.1 dmm to 160 dmm. In some embodiments, the asphalt has a penetration of 0.1 dmm to 140 dmm. In some embodiments, the asphalt has a penetration of 0 dmm to 120 dmm. In some embodiments, the asphalt has a penetration of 0 dmm to 100 dmm. In some embodiments, the asphalt has a penetration of 0 dmm to 80 dmm. In some embodiments, the asphalt has a penetration of 0.1 dmm to 60 dmm. In some embodiments, the asphalt has a penetration of 0.1 dmm to 40 dmm. In some embodiments, the asphalt has a penetration of 0.1 dmm to 20 dmm. In some embodiments, the asphalt has a penetration of 20 dmm to 200 dmm. In some embodiments, the asphalt has a penetration of 40 dmm to 180 dmm. In some embodiments, the asphalt has a penetration of 60 dmm to 160 dmm. In some embodiments, the asphalt has a penetration of 80 dmm to 140 dmm. In some embodiments, the asphalt has a penetration of 100 dmm to 120 dmm. In some embodiments, the penetration of the asphalt is measured at 77° F. according to ASTM 3462.

In some embodiments, the asphalt comprises a virgin asphalt. In some embodiments, the asphalt may be a mixture of at least two asphalts.

In some embodiments, the method comprises obtaining at least one hardening agent. In some embodiments, the at least one hardening agent comprises at least one of a rosin ester resin, a tall oil resin, any derivative thereof, or any combination thereof. In some embodiments, the at least one hardening agent comprises at least one of coumarone indene resin (CIR), alpha methyl styrene (AMS), at least one tall oil derivative, a derivative of cumene, a biobased derivative, a crude oil derivative, or any combination thereof. In some embodiments, the at least one hardening agent comprises coumarone indene resin. In some embodiments, the at least one hardening agent comprises alpha methyl styrene. In some embodiments, the at least one hardening agent comprises at least one tall oil derivative.

In some embodiments, the at least one hardening agent has a softening point of at least 150° F. In some embodiments, the at least one hardening agent has a softening point of 150° F. to 300° F. In some embodiments, the at least one hardening agent has a softening point of 150° F. to 290° F. In some embodiments, the at least one hardening agent has a softening point of 150° F. to 280° F. In some embodiments, the at least one hardening agent has a softening point of 150° F. to 270° F. In some embodiments, the at least one hardening agent has a softening point of 150° F. to 260° F. In some embodiments, the at least one hardening agent has a softening point of 150° F. to 250° F. In some embodiments, the at least one hardening agent has a softening point of 150° F. to 240° F. In some embodiments, the at least one hardening agent has a softening point of 150° F. to 230° F. In some embodiments, the at least one hardening agent has a softening point of 150° F. to 220° F. In some embodiments, the at least one hardening agent has a softening point of 150° F. to 210° F. In some embodiments, the at least one hardening agent has a softening point of 150° F. to 200° F. In some embodiments, the at least one hardening agent has a softening point of 150° F. to 190° F. In some embodiments, the at least one hardening agent has a softening point of 150° F. to 180° F. In some embodiments, the at least one hardening agent has a softening point of 150° F. to 170° F. In some embodiments, the at least one hardening agent has a softening point of 150° F. to 160° F. In some embodiments, the at least one hardening agent has a softening point of 160° F. to 300° F. In some embodiments, the at least one hardening agent has a softening point of 170° F. to 300° F. In some embodiments, the at least one hardening agent has a softening point of 180° F. to 300° F. In some embodiments, the at least one hardening agent has a softening point of 190° F. to 300° F. In some embodiments, the at least one hardening agent has a softening point of 200° F. to 300° F. In some embodiments, the at least one hardening agent has a softening point of 210° F. to 300° F. In some embodiments, the at least one hardening agent has a softening point of 220° F. to 300° F. In some embodiments, the at least one hardening agent has a softening point of 230° F. to 300° F. In some embodiments, the at least one hardening agent has a softening point of 240° F. to 300° F. In some embodiments, the at least one hardening agent has a softening point of 250° F. to 300° F. In some embodiments, the at least one hardening agent has a softening point of 260° F. to 300° F. In some embodiments, the at least one hardening agent has a softening point of 270° F. to 300° F. In some embodiments, the at least one hardening agent has a softening point of 280° F. to 300° F. In some embodiments, the at least one hardening agent has a softening point of 290° F. to 300° F. In some embodiments, the at least one hardening agent has a softening point of 160° F. to 290° F. In some embodiments, the at least one hardening agent has a softening point of 170° F. to 280° F. In some embodiments, the at least one hardening agent has a softening point of 180° F. to 270° F. In some embodiments, the at least one hardening agent has a softening point of 190° F. to 260° F. In some embodiments, the at least one hardening agent has a softening point of 200° F. to 250° F. In some embodiments, the at least one hardening agent has a softening point of 210° F. to 250° F. In some embodiments, the at least one hardening agent has a softening point of 220° F. to 240° F. In some embodiments, the softening point of the at least one hardening agent is measured according to ASTM D3461.

In some embodiments, the hardened asphalt has a softening point of 125° F. to 250° F. In some embodiments, the hardened asphalt has a softening point of 150° F. to 250° F. In some embodiments, the hardened asphalt has a softening point of 175° F. to 250° F. In some embodiments, the hardened asphalt has a softening point of 200° F. to 250° F. In some embodiments, the hardened asphalt has a softening point of 225° F. to 250° F. In some embodiments, the hardened asphalt has a softening point of 125° F. to 225° F. In some embodiments, the hardened asphalt has a softening point of 125° F. to 200° F. In some embodiments, the hardened asphalt has a softening point of 125° F. to 175° F. In some embodiments, the hardened asphalt has a softening point of 125° F. to 150° F. In some embodiments, the hardened asphalt has a softening point of 150° F. to 225° F. In some embodiments, the hardened asphalt has a softening point of 175° F. to 200° F. In some embodiments, the softening point of the hardened asphalt is measured according to ASTM D3461.

In some embodiments, the hardened asphalt has a softening point that is 10% to 100% greater than the softening point of the asphalt. In some embodiments, the hardened asphalt has a softening point that is 20% to 100% greater than the softening point of the asphalt. In some embodiments, the hardened asphalt has a softening point that is 30% to 100% greater than the softening point of the asphalt. In some embodiments, the hardened asphalt has a softening point that is 40% to 100% greater than the softening point of the asphalt. In some embodiments, the hardened asphalt has a softening point that is 50% to 100% greater than the softening point of the asphalt. In some embodiments, the hardened asphalt has a softening point that is 60% to 100% greater than the softening point of the asphalt. In some embodiments, the hardened asphalt has a softening point that is 70% to 100% greater than the softening point of the asphalt. In some embodiments, the hardened asphalt has a softening point that is 80% to 100% greater than the softening point of the asphalt. In some embodiments, the hardened asphalt has a softening point that is 90% to 100% greater than the softening point of the asphalt. In some embodiments, the hardened asphalt has a softening point that is 10% to 90% greater than the softening point of the asphalt. In some embodiments, the hardened asphalt has a softening point that is 10% to 80% greater than the softening point of the asphalt. In some embodiments, the hardened asphalt has a softening point that is 10% to 70% greater than the softening point of the asphalt. In some embodiments, the hardened asphalt has a softening point that is 10% to 60% greater than the softening point of the asphalt. In some embodiments, the hardened asphalt has a softening point that is 10% to 50% greater than the softening point of the asphalt. In some embodiments, the hardened asphalt has a softening point that is 10% to 40% greater than the softening point of the asphalt. In some embodiments, the hardened asphalt has a softening point that is 10% to 30% greater than the softening point of the asphalt. In some embodiments, the hardened asphalt has a softening point that is 10% to 20% greater than the softening point of the asphalt. In some embodiments, the hardened asphalt has a softening point that is 20% to 90% greater than the softening point of the asphalt. In some embodiments, the hardened asphalt has a softening point that is 30% to 80% greater than the softening point of the asphalt. greater than the softening point of the asphalt. In some embodiments, the hardened asphalt has a softening point that is 40% to 70% greater than the softening point of the asphalt. In some embodiments, the hardened asphalt has a softening point that is or 50% to 60% greater than the softening point of the asphalt.

In some embodiments, the hardened asphalt has a viscosity of 30 cP to 400 cP. In some embodiments, the hardened asphalt has a viscosity of 50 cP to 400 cP. In some embodiments, the hardened asphalt has a viscosity of 70 cP to 400 cP. In some embodiments, the hardened asphalt has a viscosity of 90 cP to 400 cP. In some embodiments, the hardened asphalt has a viscosity of 110 cP to 400 cP. In some embodiments, the hardened asphalt has a viscosity of 130 cP to 400 cP. In some embodiments, the hardened asphalt has a viscosity of 150 cP to 400 cP. In some embodiments, the hardened asphalt has a viscosity of 170 cP to 400 cP. In some embodiments, the hardened asphalt has a viscosity of 190 cP to 400 cP. In some embodiments, the hardened asphalt has a viscosity of 210 cP to 400 cP. In some embodiments, the hardened asphalt has a viscosity of 230 cP to 400 cP. In some embodiments, the hardened asphalt has a viscosity of 250 cP to 400 cP. In some embodiments, the hardened asphalt has a viscosity of 270 cP to 400 cP. In some embodiments, the hardened asphalt has a viscosity of 290 cP to 400 cP. In some embodiments, the hardened asphalt has a viscosity of 310 cP to 400 cP. In some embodiments, the hardened asphalt has a viscosity of 330 cP to 400 cP. In some embodiments, the hardened asphalt has a viscosity of 350 cP to 400 cP. In some embodiments, the hardened asphalt has a viscosity of 370 cP to 400 cP. In some embodiments, the hardened asphalt has a viscosity of 30 cP to 380 cP. In some embodiments, the hardened asphalt has a viscosity of 30 cP to 360 cP. In some embodiments, the hardened asphalt has a viscosity of 30 cP to 340 cP. In some embodiments, the hardened asphalt has a viscosity of 30 cP to 320 cP. In some embodiments, the hardened asphalt has a viscosity of 30 cP to 300 cP. In some embodiments, the hardened asphalt has a viscosity of 30 cP to 280 cP. In some embodiments, the hardened asphalt has a viscosity of 30 cP to 260 cP. In some embodiments, the hardened asphalt has a viscosity of 30 cP to 240 cP. In some embodiments, the hardened asphalt has a viscosity of 30 cP to 220 cP. In some embodiments, the hardened asphalt has a viscosity of 30 cP to 200 cP. In some embodiments, the hardened asphalt has a viscosity of 30 cP to 180 cP. In some embodiments, the hardened asphalt has a viscosity of 30 cP to 160 cP. In some embodiments, the hardened asphalt has a viscosity of 30 cP to 140 cP. In some embodiments, the hardened asphalt has a viscosity of 30 cP to 120 cP. In some embodiments, the hardened asphalt has a viscosity of 30 cP to 100 cP. In some embodiments, the hardened asphalt has a viscosity of 30 cP to 80 cP. In some embodiments, the hardened asphalt has a viscosity of 30 cP to 60 cP. In some embodiments, the hardened asphalt has a viscosity of 30 cP to 40 cP. In some embodiments, the hardened asphalt has a viscosity of 50 cP to 380 cP. In some embodiments, the hardened asphalt has a viscosity of 70 cP to 360 cP. In some embodiments, the hardened asphalt has a viscosity of 90 cP to 340 cP. In some embodiments, the hardened asphalt has a viscosity of 110 cP to 320 cP. In some embodiments, the hardened asphalt has a viscosity of 130 cP to 300 cP. In some embodiments, the hardened asphalt has a viscosity of 150 cP to 280 cP. In some embodiments, the hardened asphalt has a viscosity of 170 cP to 260 cP. In some embodiments, the hardened asphalt has a viscosity of 190 cP to 240 cP. In some embodiments, the hardened asphalt has a viscosity of or 210 cP to 200 cP. In some embodiments, the viscosity of the hardened asphalt is measured at 400° F. according to ASTM D4402.

In some embodiments, the hardened asphalt has a penetration of 10 dmm to 50 dmm. In some embodiments, the hardened asphalt has a penetration of 15 dmm to 50 dmm. In some embodiments, the hardened asphalt has a penetration of 20 dmm to 50 dmm. In some embodiments, the hardened asphalt has a penetration of 25 dmm to 50 dmm. In some embodiments, the hardened asphalt has a penetration of 30 dmm to 50 dmm. In some embodiments, the hardened asphalt has a penetration of 35 dmm to 50 dmm. In some embodiments, the hardened asphalt has a penetration of 40 dmm to 50 dmm. In some embodiments, the hardened asphalt has a penetration of 45 dmm to 50 dmm. In some embodiments, the hardened asphalt has a penetration of 10 dmm to 45 dmm. In some embodiments, the hardened asphalt has a penetration of 10 dmm to 40 dmm. In some embodiments, the hardened asphalt has a penetration of 10 dmm to 35 dmm. In some embodiments, the hardened asphalt has a penetration of 10 dmm to 30 dmm. In some embodiments, the hardened asphalt has a penetration of 10 dmm to 25 dmm. In some embodiments, the hardened asphalt has a penetration of 10 dmm to 20 dmm. In some embodiments, the hardened asphalt has a penetration of 10 dmm to 15 dmm. In some embodiments, the hardened asphalt has a penetration of 15 dmm to 45 dmm. In some embodiments, the hardened asphalt has a penetration of 20 dmm to 40 dmm. In some embodiments, the hardened asphalt has a penetration of 25 dmm to 35 dmm. In some embodiments, the penetration of the hardened asphalt is measured at 77° F. according to ASTM 3462.

In some embodiments, the method comprises mixing the at least one hardening gent with the asphalt, so as to form a hardened asphalt.

In some embodiments, the mixing comprises mixing in at least one of a low shear mixer, a high shear mixer, a static mixer, an extruder, or any combination thereof. In some embodiments, the mixing comprises heat mixing, dry mixing, or any combination thereof. A non-limiting example of a low shear mixer is EUROSTAR® 60 Digital, IKA Works, Inc., Wilmington, N.C., which mixes batches at about 500 to 1500 RPM, with a paddle-type blade to generate low shear. A non-limiting example of a high shear mixer is SILVERSON® L5M-A Laboratory Mixer, Silverson Machines, Inc., East Longmeadow, Mass., which mixes batches at or above 3200 RPM, with a blade and a head that are configured to generate high shear, as well as heat mixing. It will be appreciated that other types of mixing and mixers may be used herein without departing from the scope of this disclosure.

In some embodiments, the mixing comprises mixing under heating. In some embodiments, the heating comprises a temperature of 300° F. to 425° F. In some embodiments, the heating comprises a temperature of 300° F. to 420° F. In some embodiments, the heating comprises a temperature of 300° F. to 410° F. In some embodiments, the heating comprises a temperature of 300° F. to 400° F. In some embodiments, the heating comprises a temperature of 300° F. to 390° F. In some embodiments, the heating comprises a temperature of 300° F. to 380° F. In some embodiments, the heating comprises a temperature of 300° F. to 370° F. In some embodiments, the heating comprises a temperature of 300° F. to 360° F. In some embodiments, the heating comprises a temperature of 300° F. to 350° F. In some embodiments, the heating comprises a temperature of 300° F. to 340° F. In some embodiments, the heating comprises a temperature of 300° F. to 330° F. In some embodiments, the heating comprises a temperature of 300° F. to 320° F. In some embodiments, the heating comprises a temperature of 300° F. to 310° F. In some embodiments, the heating comprises a temperature of 310° F. to 425° F. In some embodiments, the heating comprises a temperature of 320° F. to 425° F. In some embodiments, the heating comprises a temperature of 330° F. to 425° F. In some embodiments, the heating comprises a temperature of 340° F. to 425° F. In some embodiments, the heating comprises a temperature of 350° F. to 425° F. In some embodiments, the heating comprises a temperature of 360° F. to 425° F. In some embodiments, the heating comprises a temperature of 370° F. to 425° F. In some embodiments, the heating comprises a temperature of 380° F. to 425° F. In some embodiments, the heating comprises a temperature of 390° F. to 425° F. In some embodiments, the heating comprises a temperature of 400° F. to 425° F. In some embodiments, the heating comprises a temperature of 410° F. to 425° F. In some embodiments, the heating comprises a temperature of 420° F. to 425° F.

In some embodiments, the at least one hardening agent is mixed with the asphalt in a weight ratio of 1:100 to 1:2. In some embodiments, the at least one hardening agent is mixed with the asphalt in a weight ratio of 1:90 to 1:2. In some embodiments, the at least one hardening agent is mixed with the asphalt in a weight ratio of 1:80 to 1:2. In some embodiments, the at least one hardening agent is mixed with the asphalt in a weight ratio of 1:70 to 1:2. In some embodiments, the at least one hardening agent is mixed with the asphalt in a weight ratio of 1:60 to 1:2. In some embodiments, the at least one hardening agent is mixed with the asphalt in a weight ratio of 1:50 to 1:2. In some embodiments, the at least one hardening agent is mixed with the asphalt in a weight ratio of 1:40 to 1:2. In some embodiments, the at least one hardening agent is mixed with the asphalt in a weight ratio of 1:30 to 1:2. In some embodiments, the at least one hardening agent is mixed with the asphalt in a weight ratio of 1:20 to 1:2. In some embodiments, the at least one hardening agent is mixed with the asphalt in a weight ratio of 1:10 to 1:2. In some embodiments, the at least one hardening agent is mixed with the asphalt in a weight ratio of 1:100 to 1:12. In some embodiments, the at least one hardening agent is mixed with the asphalt in a weight ratio of 1:100 to 1:22. In some embodiments, the at least one hardening agent is mixed with the asphalt in a weight ratio of 1:100 to 1:32. In some embodiments, the at least one hardening agent is mixed with the asphalt in a weight ratio of 1:100 to 1:42. In some embodiments, the at least one hardening agent is mixed with the asphalt in a weight ratio of 1:100 to 1:52. In some embodiments, the at least one hardening agent is mixed with the asphalt in a weight ratio of 1:100 to 1:62. In some embodiments, the at least one hardening agent is mixed with the asphalt in a weight ratio of 1:100 to 1:72. In some embodiments, the at least one hardening agent is mixed with the asphalt in a weight ratio of 1:100 to 1:82. In some embodiments, the at least one hardening agent is mixed with the asphalt in a weight ratio of 1:100 to 1:92. In some embodiments, the at least one hardening agent is mixed with the asphalt in a weight ratio of 1:90 to 1:12. In some embodiments, the at least one hardening agent is mixed with the asphalt in a weight ratio of 1:80 to 1:22. In some embodiments, the at least one hardening agent is mixed with the asphalt in a weight ratio of 1:70 to 1:32. In some embodiments, the at least one hardening agent is mixed with the asphalt in a weight ratio of 1:60 to 1:42.

In some embodiments, the method comprises obtaining at least one polymer.

In some embodiments, the at least one polymer comprises at least one of polystyrene, a styrenic block copolymer, silicone, silicone polyester resin, high temperature time (HTT) resin, ethylene vinyl acetate copolymer, polyaminoamide (PAA) wax, or any combination thereof. In some embodiments, the at least one styrenic block copolymer comprises at least one of a styrene-butadiene-styrene block copolymer (SBS), a styrene-ethylene-butylene-styrene block copolymer (SEBS), a styrene-ethylene-propylene-styrene block copolymer (SEPS), a styrene-isoprene-styrene block copolymer (SIS), or any combination thereof. In some embodiments, the at least one polymer comprises at least one of polystyrene, a styrene-butadiene-styrene block copolymer (SBS), a styrene-ethylene-butylene-styrene block copolymer (SEBS), a styrene-ethylene-propylene-styrene block copolymer (SEPS), a styrene-isoprene-styrene block copolymer (SIS), silicone, silicone polyester resin, high temperature time (HTT) resin, ethylene vinyl acetate copolymer, polyaminoamide (PAA) wax, or any combination thereof.

In some embodiments, the method comprises mixing the at least one polymer with the asphalt, so as to result in polymer modified asphalt (PMA).

In some embodiments, the at least one polymer and the at least one hardening agent are mixed with the asphalt at the same time. In some embodiments, the at least one polymer is mixed with the asphalt after the step of mixing the at least one hardening agent with the asphalt.

In some embodiments, the PMA has a softening point of 200° F. to 300° F. In some embodiments, the PMA has a softening point of 210° F. to 300° F. In some embodiments, the PMA has a softening point of 220° F. to 300° F. In some embodiments, the PMA has a softening point of 230° F. to 300° F. In some embodiments, the PMA has a softening point of 240° F. to 300° F. In some embodiments, the PMA has a softening point of 250° F. to 300° F. In some embodiments, the PMA has a softening point of 260° F. to 300° F. In some embodiments, the PMA has a softening point of 270° F. to 300° F. In some embodiments, the PMA has a softening point of 280° F. to 300° F. In some embodiments, the PMA has a softening point of 290° F. to 300° F. In some embodiments, the PMA has a softening point of 200° F. to 290° F. In some embodiments, the PMA has a softening point of 200° F. to 280° F. In some embodiments, the PMA has a softening point of 200° F. to 270° F. In some embodiments, the PMA has a softening point of 200° F. to 260° F. In some embodiments, the PMA has a softening point of 200° F. to 250° F. In some embodiments, the PMA has a softening point of 200° F. to 240° F. In some embodiments, the PMA has a softening point of 200° F. to 230° F. In some embodiments, the PMA has a softening point of 200° F. to 220° F. In some embodiments, the PMA has a softening point of 200° F. to 210° F. In some embodiments, the PMA has a softening point of 210° F. to 290° F. In some embodiments, the PMA has a softening point of 220° F. to 280° F. In some embodiments, the PMA has a softening point of 230° F. to 270° F. In some embodiments, the PMA has a softening point of 240° F. to 260° F. In some embodiments, the softening point of the PMA is measured according to ASTM D3461.

In some embodiments, the PMA has a softening point that is 50% to 200% greater than the softening point of the asphalt. In some embodiments, the hardened asphalt has a softening point that is 75% to 200% greater than the softening point of the asphalt. In some embodiments, the PMA has a softening point that is 100% to 200% greater than the softening point of the asphalt. In some embodiments, the PMA has a softening point that is 125% to 200% greater than the softening point of the asphalt. In some embodiments, the PMA has a softening point that is 150% to 200% greater than the softening point of the asphalt. In some embodiments, the PMA has a softening point that is 175% to 200% greater than the softening point of the asphalt. In some embodiments, the PMA has a softening point that is 50% to 175% greater than the softening point of the asphalt. In some embodiments, the PMA has a softening point that is 50% to 150% greater than the softening point of the asphalt. In some embodiments, the PMA has a softening point that is 50% to 125% greater than the softening point of the asphalt. In some embodiments, the PMA has a softening point that is 50% to 100% greater than the softening point of the asphalt. In some embodiments, the PMA has a softening point that is 50% to 75% greater than the softening point of the asphalt. In some embodiments, the PMA has a softening point that is 75% to 175% greater than the softening point of the asphalt. In some embodiments, the PMA has a softening point that is 100% to 150% greater than the softening point of the asphalt.

In some embodiments, the PMA has a viscosity of 200 cP to 400 cP. In some embodiments, the PMA has a viscosity of 220 cP to 400 cP. In some embodiments, the PMA has a viscosity of 240 cP to 400 cP. In some embodiments, the PMA has a viscosity of 260 cP to 400 cP. In some embodiments, the PMA has a viscosity of 280 cP to 400 cP. In some embodiments, the PMA has a viscosity of 300 cP to 400 cP. In some embodiments, the PMA has a viscosity of 320 cP to 400 cP. In some embodiments, the PMA has a viscosity of 340 cP to 400 cP. In some embodiments, the PMA has a viscosity of 360 cP to 400 cP. In some embodiments, the PMA has a viscosity of 380 cP to 400 cP. In some embodiments, the PMA has a viscosity of 200 cP to 380 cP. In some embodiments, the PMA has a viscosity of 200 cP to 360 cP. In some embodiments, the PMA has a viscosity of 200 cP to 340 cP. In some embodiments, the PMA has a viscosity of 200 cP to 320 cP. In some embodiments, the PMA has a viscosity of 200 cP to 300 cP. In some embodiments, the PMA has a viscosity of 200 cP to 280 cP. In some embodiments, the PMA has a viscosity of 200 cP to 260 cP. In some embodiments, the PMA has a viscosity of 200 cP to 240 cP. In some embodiments, the PMA has a viscosity of 200 cP to 220 cP. In some embodiments, the PMA has a viscosity of 220 cP to 380 cP. In some embodiments, the PMA has a viscosity of 240 cP to 360 cP. In some embodiments, the PMA has a viscosity of 260 cP to 340 cP. In some embodiments, the PMA has a viscosity of 280 cP to 320 cP. In some embodiments, the viscosity of the PMA is measured at 400° F. according to ASTM D4402.

In some embodiments, the PMA has a penetration of 10 dmm to 40 dmm. In some embodiments, the PMA has a penetration of 15 dmm to 40 dmm. In some embodiments, the PMA has a penetration of 20 dmm to 40 dmm. In some embodiments, the PMA has a penetration of 25 dmm to 40 dmm. In some embodiments, the PMA has a penetration of 30 dmm to 40 dmm. In some embodiments, the PMA has a penetration of 35 dmm to 40 dmm. In some embodiments, the PMA has a penetration of 10 dmm to 35 dmm. In some embodiments, the PMA has a penetration of 10 dmm to 30 dmm. In some embodiments, the PMA has a penetration of 10 dmm to 25 dmm. In some embodiments, the PMA has a penetration of 10 dmm to 20 dmm. In some embodiments, the PMA has a penetration of 10 dmm to 15 dmm. In some embodiments, the PMA has a penetration of 15 dmm to 35 dmm. In some embodiments, the PMA has a penetration of 20 dmm to 30 dmm. In some embodiments, the penetration of the PMA is measured at 77° F. according to ASTM 3462.

In some embodiments, the PMA does not comprise a plasticizer. Examples of plasticizers include, without limitation, at least one of processing oil (e.g., napthenic processing oil), hydrocarbon oils (e.g. paraffin, aromatic and naphthenic oils), long chain alkyl diesters (e.g. phthalic acid esters, such as dioctyl phthalate, and adipic acid esters, such as dioctyl adipate), sebacic acid esters, glycol, fatty acid, phosphoric esters, stearic esters, epoxy plasticizers (e.g. epoxidized soybean oil), polyether plasticizers, polyester plasticizers, alkyl monoesters (e.g. butyl oleate), long chain partial ether esters (e.g. butyl cellosolve oleate), or any combination thereof.

In some embodiments, the at least one polymer is mixed with the hardened asphalt in a weight ratio of 1:100 to 1:5. In some embodiments, the at least one polymer is mixed with the hardened asphalt in a weight ratio of 1:90 to 1:5. In some embodiments, the at least one polymer is mixed with the hardened asphalt in a weight ratio of 1:80 to 1:5. In some embodiments, the at least one polymer is mixed with the hardened asphalt in a weight ratio of 1:70 to 1:5. In some embodiments, the at least one polymer is mixed with the hardened asphalt in a weight ratio of 1:60 to 1:5. In some embodiments, the at least one polymer is mixed with the hardened asphalt in a weight ratio of 1:50 to 1:5. In some embodiments, the at least one polymer is mixed with the hardened asphalt in a weight ratio of 1:40 to 1:5. In some embodiments, the at least one polymer is mixed with the hardened asphalt in a weight ratio of 1:30 to 1:5. In some embodiments, the at least one polymer is mixed with the hardened asphalt in a weight ratio of 1:20 to 1:5. In some embodiments, the at least one polymer is mixed with the hardened asphalt in a weight ratio of 1:10 to 1:5. In some embodiments, the at least one polymer is mixed with the hardened asphalt in a weight ratio of 1:100 to 1:15. In some embodiments, the at least one polymer is mixed with the hardened asphalt in a weight ratio of 1:100 to 1:25. In some embodiments, the at least one polymer is mixed with the hardened asphalt in a weight ratio of 1:100 to 1:35. In some embodiments, the at least one polymer is mixed with the hardened asphalt in a weight ratio of 1:100 to 1:45. In some embodiments, the at least one polymer is mixed with the hardened asphalt in a weight ratio of 1:100 to 1:55. In some embodiments, the at least one polymer is mixed with the hardened asphalt in a weight ratio of 1:100 to 1:65. In some embodiments, the at least one polymer is mixed with the hardened asphalt in a weight ratio of 1:100 to 1:75. In some embodiments, the at least one polymer is mixed with the hardened asphalt in a weight ratio of 1:100 to 1:85. In some embodiments, the at least one polymer is mixed with the hardened asphalt in a weight ratio of 1:100 to 1:95. In some embodiments, the at least one polymer is mixed with the hardened asphalt in a weight ratio of 1:90 to 1:15. In some embodiments, the at least one polymer is mixed with the hardened asphalt in a weight ratio of 1:80 to 1:25. In some embodiments, the at least one polymer is mixed with the hardened asphalt in a weight ratio of 1:70 to 1:35. In some embodiments, the at least one polymer is mixed with the hardened asphalt in a weight ratio of 1:60 to 1:45.

In some embodiments, the method comprises an oxidation step. In some embodiments, the method does not comprise an oxidation step.

In some embodiments, the method comprises obtaining at least one filler.

In some embodiments, the filler comprises, consists of, or consists essentially of at least one of limestone, glass, calcium carbonate, barium sulfate, calcium sulfate, talc, perlite, silica, fumed silica, precipitated silica, quartz, aluminum trihydrate, magnesium hydroxide, ammonium polyphosphate, colemanite, titanium dioxide, calcium sulfate, fly ash, graphene nanoparticles, carbon black, recycled materials (e.g., such as one or more of recycled rubber tires, recycled shingles, recycled thermoplastic resins), basalt, roofing granules, graphite, clay, or any combination thereof. In some embodiments, the filler comprises at least one additive. In some embodiments, the at least one additive comprises or is selected from the group stabilizers, antioxidants, colorants, nucleating agents, mold release agents, dispersing agents, UV light absorbers, flame retardants, coloring agents, mold release agents, anti-static agents, pigments, or any combination thereof.

In some embodiments, the method comprises mixing the at least one filler with the PMA, so as to form a filled coating.

In some embodiments, the filled coating comprises 10% to 70% by weight of the at least one filler based on a total weight of the filled coating. In some embodiments, the filled coating comprises 10% to 65% by weight of the at least one filler based on the total weight of the filled coating. In some embodiments, the filled coating comprises 10% to 60% by weight of the at least one filler based on the total weight of the filled coating. In some embodiments, the filled coating comprises 10% to 55% by weight of the at least one filler based on the total weight of the filled coating. In some embodiments, the filled coating comprises 10% to 50% by weight of the at least one filler based on the total weight of the filled coating. In some embodiments, the filled coating comprises 10% to 45% by weight of the at least one filler based on the total weight of the filled coating. In some embodiments, the filled coating comprises 10% to 40% by weight of the at least one filler based on the total weight of the filled coating. In some embodiments, the filled coating comprises 10% to 35% by weight of the at least one filler based on the total weight of the filled coating. In some embodiments, the filled coating comprises 10% to 30% by weight of the at least one filler based on the total weight of the filled coating. In some embodiments, the filled coating comprises 10% to 25% by weight of the at least one filler based on the total weight of the filled coating. In some embodiments, the filled coating comprises 10% to 20% by weight of the at least one filler based on the total weight of the filled coating. In some embodiments, the filled coating comprises 10% to 15% by weight of the at least one filler based on the total weight of the filled coating.

In some embodiments, the filled coating comprises 15% to 70% by weight of the at least one filler based on the total weight of the filled coating. In some embodiments, the filled coating comprises 20% to 70% by weight of the at least one filler based on the total weight of the filled coating. In some embodiments, the filled coating comprises 25% to 70% by weight of the at least one filler based on the total weight of the filled coating. In some embodiments, the filled coating comprises 30% to 70% by weight of the at least one filler based on the total weight of the filled coating. In some embodiments, the filled coating comprises 35% to 70% by weight of the at least one filler based on the total weight of the filled coating. In some embodiments, the filled coating comprises 40% to 70% by weight of the at least one filler based on the total weight of the filled coating. In some embodiments, the filled coating comprises 45% to 70% by weight of the at least one filler based on the total weight of the filled coating. In some embodiments, the filled coating comprises 50% to 70% by weight of the at least one filler based on the total weight of the filled coating. In some embodiments, the filled coating comprises 55% to 70% by weight of the at least one filler based on the total weight of the filled coating. In some embodiments, the filled coating comprises 60% to 70% by weight of the at least one filler based on the total weight of the filled coating. In some embodiments, the filled coating comprises 65% to 70% by weight of the at least one filler based on the total weight of the filled coating.

In some embodiments, the filled coating comprises 30% to 90% by weight of the PMA based on the total weight of the filled coating. In some embodiments, the filled coating comprises 30% to 85% by weight of the PMA based on the total weight of the filled coating. In some embodiments, the filled coating comprises 30% to 80% by weight of the PMA based on the total weight of the filled coating. In some embodiments, the filled coating comprises 30% to 75% by weight of the PMA based on the total weight of the filled coating. In some embodiments, the filled coating comprises 30% to 70% by weight of the PMA based on the total weight of the filled coating. In some embodiments, the filled coating comprises 30% to 65% by weight of the PMA based on the total weight of the filled coating. In some embodiments, the filled coating comprises 30% to 60% by weight of the PMA based on the total weight of the filled coating. In some embodiments, the filled coating comprises 30% to 55% by weight of the PMA based on the total weight of the filled coating. In some embodiments, the filled coating comprises 30% to 50% by weight of the PMA based on the total weight of the filled coating. In some embodiments, the filled coating comprises 30% to 45% by weight of the PMA based on the total weight of the filled coating. In some embodiments, the filled coating comprises 30% to 40% by weight of the PMA based on the total weight of the filled coating. In some embodiments, the filled coating comprises 30% to 35% by weight of the PMA based on the total weight of the filled coating.

In some embodiments, the filled coating comprises 35% to 90% by weight of the PMA based on the total weight of the filled coating. In some embodiments, the filled coating comprises 40% to 90% by weight of the PMA based on the total weight of the filled coating. In some embodiments, the filled coating comprises 45% to 90% by weight of the PMA based on the total weight of the filled coating. In some embodiments, the filled coating comprises 50% to 90% by weight of the PMA based on the total weight of the filled coating. In some embodiments, the filled coating comprises 55% to 90% by weight of the PMA based on the total weight of the filled coating. In some embodiments, the filled coating comprises 60% to 90% by weight of the PMA based on the total weight of the filled coating. In some embodiments, the filled coating comprises 65% to 90% by weight of the PMA based on the total weight of the filled coating. In some embodiments, the filled coating comprises 70% to 90% by weight of the PMA based on the total weight of the filled coating. In some embodiments, the filled coating comprises 75% to 90% by weight of the PMA based on the total weight of the filled coating. In some embodiments, the filled coating comprises 80% to 90% by weight of the PMA based on the total weight of the filled coating. In some embodiments, the filled coating comprises 85% to 90% by weight of the PMA based on the total weight of the filled coating.

In some embodiments, the method comprises obtaining a roofing substrate.

In some embodiments, the roofing substrate comprises, consists of, or consists essentially of at least one of a plywood substrate, a glass substrate, a cellulosic substrate, a polymeric substrate, a shingle, a scrim, a fabric, a glass mat, a fiberglass mat, an asphalt-coated fiberglass mat, a fabric, an underlayment, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, a gypsum board, or any combination thereof), a pipe, a base sheet, a chimney, a wax paper, or any combination thereof. In some embodiments, the substrate comprises asphalt. In some embodiments, the substrate does not comprise asphalt (e.g., 0% by weight of asphalt based on a total weight of the substrate). In some embodiments, the roofing substrate comprises, consists of, or consists essentially of at least one of plywood, cement, concrete, asphaltic shingles, compressed fiberboard, gypsum, oriented strand board, concrete masonry units, masonry blocks, bricks, polyiso foam, polyisocyanurate, steel, aluminum, copper, minerals, limestone, thermoplastic polyolefin, polyvinyl chloride, silicone, polyvinylidene fluoride, polymethyl methacrylate, acrylic or combinations thereof.

In some embodiments, the method comprises applying the filled coating to the roofing substrate, so as to form a roofing shingle.

In some embodiments, the applying comprises pressing (e.g., roll pressing) the filled coating into the roofing substrate (e.g., so as to impregnate the roofing substrate, saturate the roofing substrate, or any combination thereof). In some embodiments, the applying comprises pouring the filled coating onto the roofing substrate. In some embodiments, the applying comprises coating the roofing substrate with the filled coating. In some embodiments, the applying comprising depositing the filled coating on the roofing substrate.

In some embodiments, the filled coating is roll pressed onto the roofing substrate, so as to form a roofing shingle. In some embodiments, the filled coating is poured onto the roofing substrate, so as to form a roofing shingle. In some embodiments, the roofing substrate is dipped into the filled coating, so as to form a roofing shingle. In some embodiments, the roofing substrate is impregnated with the filled coating, so as to form a roofing shingle. In some embodiments, the roofing substrate is saturated with the filled coating, so as to form a roofing shingle.

In some embodiments, the filled coating has a thickness of 20 mil to 200 mil. In some embodiments, the filled coating has a thickness of 20 mil to 190 mil. In some embodiments, the filled coating has a thickness of 20 mil to 180 mil. In some embodiments, the filled coating has a thickness of 20 mil to 170 mil. In some embodiments, the filled coating has a thickness of 20 mil to 160 mil. In some embodiments, the filled coating has a thickness of 20 mil to 150 mil. In some embodiments, the filled coating has a thickness of 20 mil to 140 mil. In some embodiments, the filled coating has a thickness of 20 mil to 130 mil. In some embodiments, the filled coating has a thickness of 20 mil to 120 mil. In some embodiments, the filled coating has a thickness of 20 mil to 110 mil. In some embodiments, the filled coating has a thickness of 20 mil to 100 mil. In some embodiments, the filled coating has a thickness of 20 mil to 90 mil. In some embodiments, the filled coating has a thickness of 20 mil to 80 mil. In some embodiments, the filled coating has a thickness of 20 mil to 70 mil. In some embodiments, the filled coating has a thickness of 20 mil to 60 mil. In some embodiments, the filled coating has a thickness of 20 mil to 50 mil. In some embodiments, the filled coating has a thickness of 20 mil to 40 mil. In some embodiments, the filled coating has a thickness of 20 mil to 30 mil.

In some embodiments, the filled coating has a thickness of 30 mil to 200 mil. In some embodiments, the filled coating has a thickness of 40 mil to 200 mil. In some embodiments, the filled coating has a thickness of 50 mil to 200 mil. In some embodiments, the filled coating has a thickness of 60 mil to 200 mil. In some embodiments, the filled coating has a thickness of 70 mil to 200 mil. In some embodiments, the filled coating has a thickness of 80 mil to 200 mil. In some embodiments, the filled coating has a thickness of 90 mil to 200 mil. In some embodiments, the filled coating has a thickness of 100 mil to 200 mil. In some embodiments, the filled coating has a thickness of 110 mil to 200 mil. In some embodiments, the filled coating has a thickness of 120 mil to 200 mil. In some embodiments, the filled coating has a thickness of 130 mil to 200 mil. In some embodiments, the filled coating has a thickness of 140 mil to 200 mil. In some embodiments, the filled coating has a thickness of 150 mil to 200 mil. In some embodiments, the filled coating has a thickness of 160 mil to 200 mil. In some embodiments, the filled coating has a thickness of 170 mil to 200 mil. In some embodiments, the filled coating has a thickness of 180 mil to 200 mil. In some embodiments, the filled coating has a thickness of 190 mil to 200 mil.

The present disclosure will now be described with reference to non-limiting exemplary embodiments depicted in FIGS. 1-5.

FIG. 1 depicts a non-limiting embodiment of a method 100, according to some embodiments. As shown in FIG. 1, the method 100 comprises a step 102 of obtaining asphalt, a step 104 of obtaining at least one hardening agent, and a step 106 of mixing the at least one hardening agent with the asphalt so as to form hardened asphalt.

Figure 2:
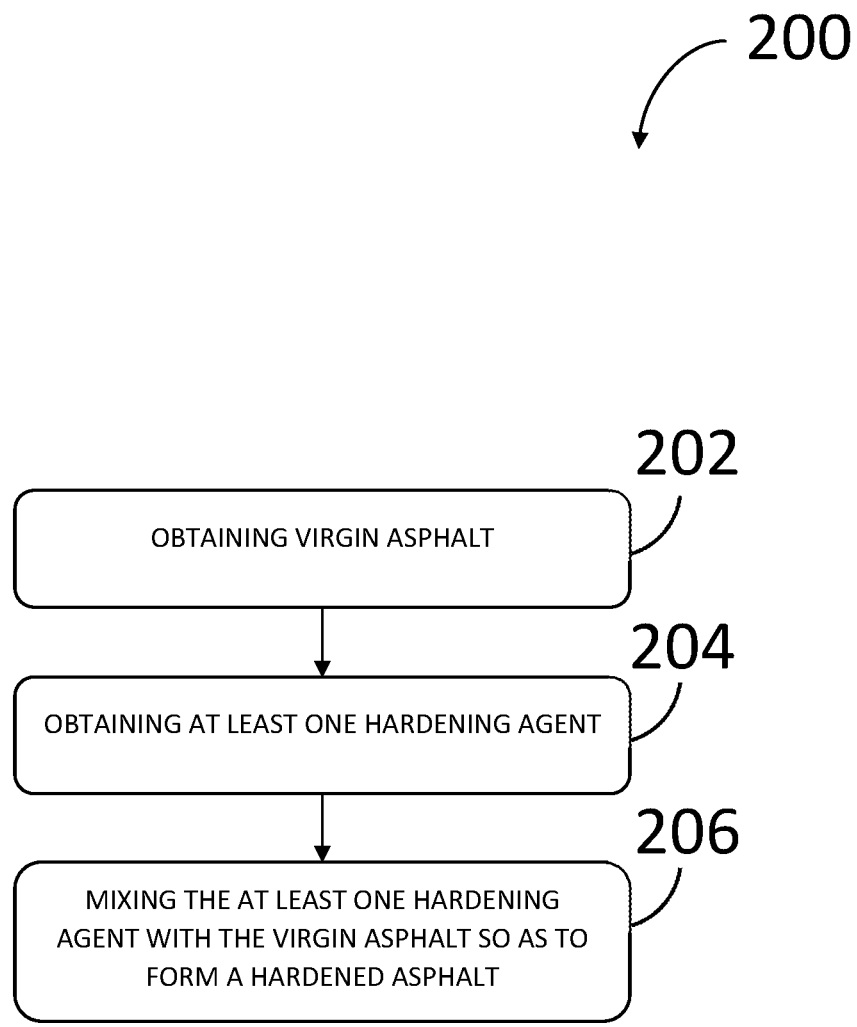
FIG. 2 depicts a non-limiting embodiment of a method of hardening asphalt, according to some embodiments.

FIG. 2 depicts a non-limiting embodiment of a method 200, according to some embodiments. As shown in FIG. 2, the method 200 comprises a step 202 of obtaining virgin asphalt, a step 204 of obtaining at least one hardening agent, and a step 206 of mixing the at least one hardening agent with the virgin asphalt so as to form hardened 206.

Figure 3:
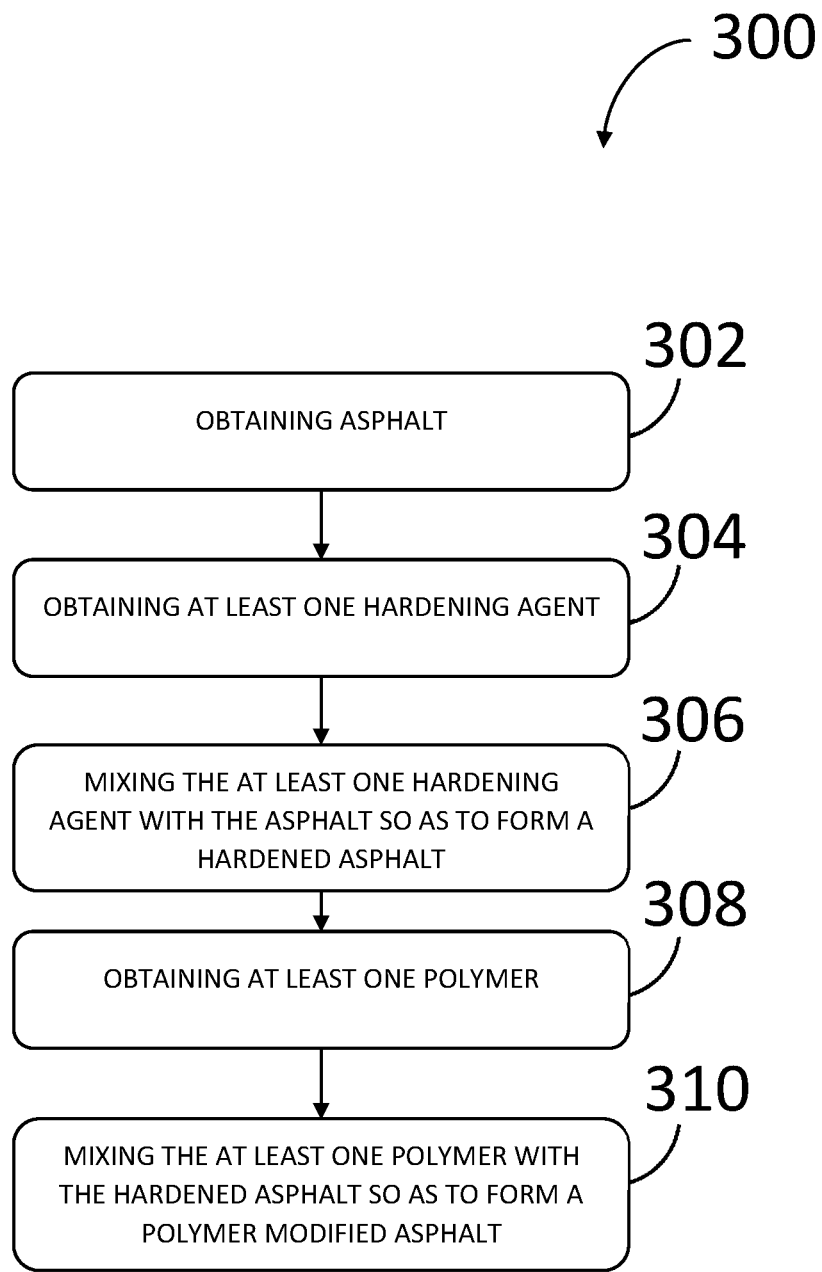
FIG. 3 depicts a non-limiting embodiment of a method of hardening asphalt, according to some embodiments.

FIG. 3 depicts a non-limiting embodiment of a method 300, according to some embodiments. As shown in FIG. 3, the method 300 comprises a step of 302 obtaining asphalt, a step of 304 obtaining at least one hardening agent, and a step of 306 mixing the at least one hardening agent with the asphalt so as to form a hardened asphalt. In addition, as shown in FIG. 3, the method 300 comprises a step 308 of obtaining at least one polymer and a step 310 of mixing the at least one polymer with the hardened asphalt so as to form a PMA.

Figure 4:
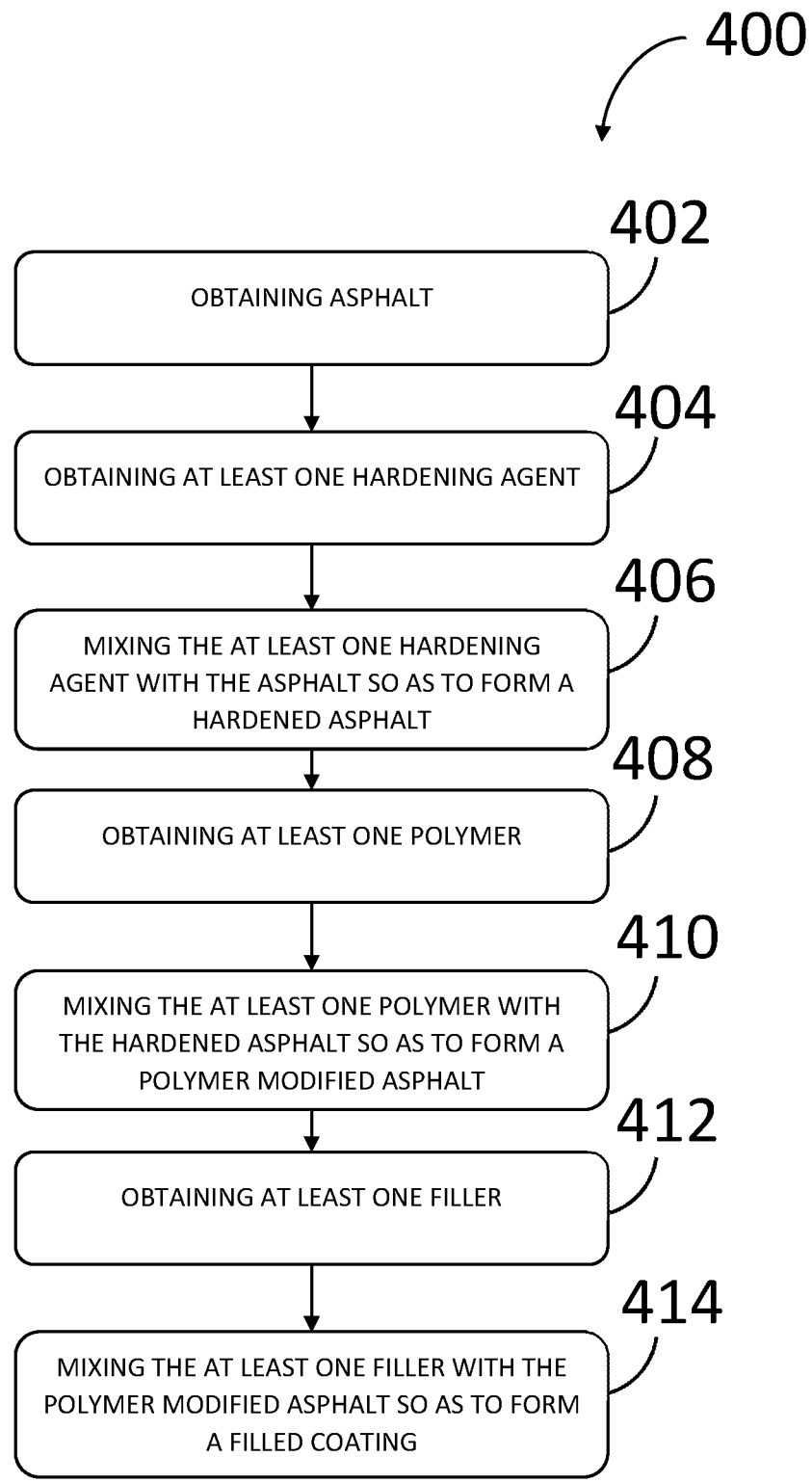
FIG. 4 depicts a non-limiting embodiment of a method of hardening asphalt, according to some embodiments.

FIG. 4 depicts a non-limiting embodiment of a method 400, according to some embodiments. As shown in FIG. 4, the method 400 comprises a step of 402 obtaining asphalt, a step of 404 obtaining at least one hardening agent, and a step of 406 mixing the at least one hardening agent with the asphalt, so as to form a hardened asphalt. In addition, as shown in FIG. 4, the method 400 comprises a step 408 of obtaining at least one polymer, a step 410 of mixing the at least one polymer with the hardened asphalt, so as to form a PMA, a step 412 of obtaining at least one filler, and a step 414 of mixing the at least one filler with the PMA, so as to form a filled coating.

Figure 5:
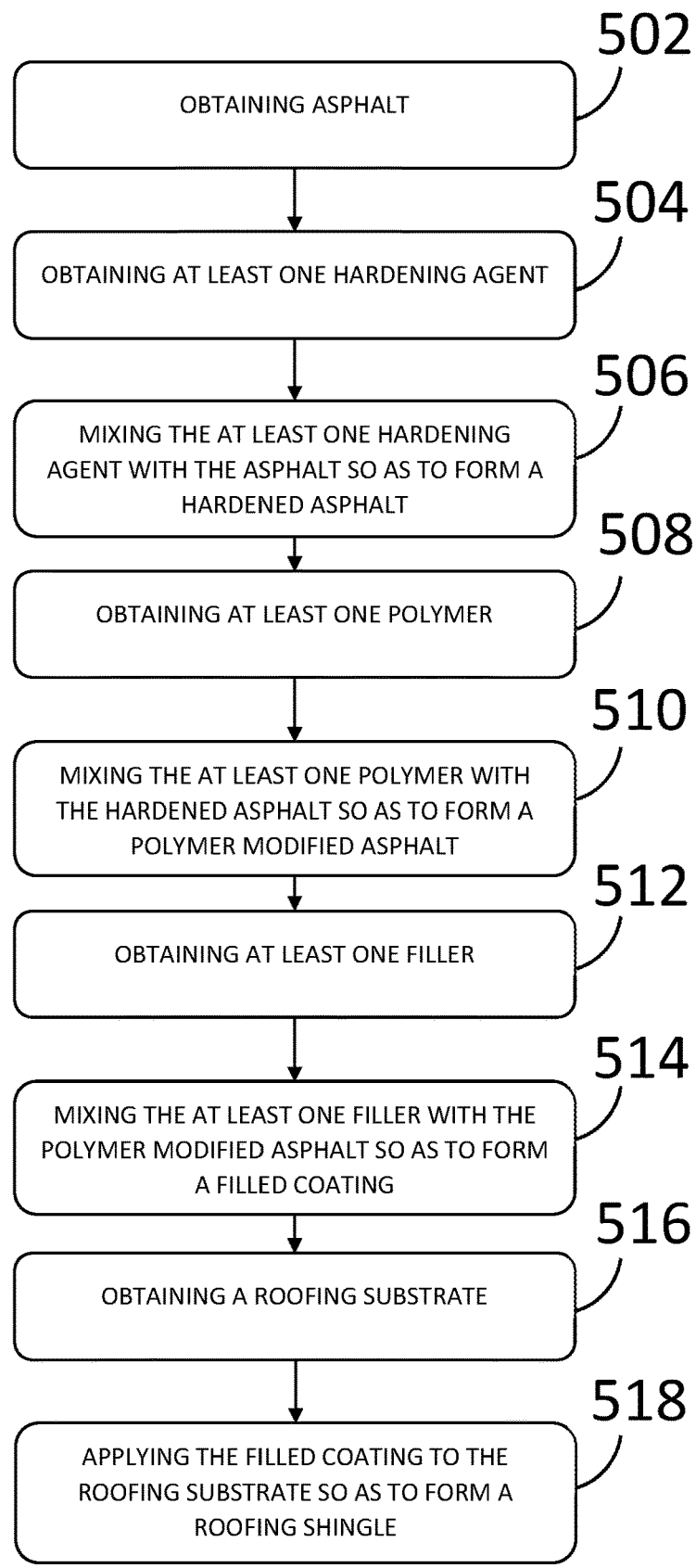
FIG. 5 depicts a non-limiting embodiment of a method of hardening asphalt, according to some embodiments.

FIG. 5 depicts a non-limiting embodiment of a method 500, according to some embodiments. As shown in FIG. 5, the method 500 comprises a step of 502 obtaining asphalt, a step of 504 obtaining at least one hardening agent, and a step of 506 mixing the at least one hardening agent with the asphalt, so as to form a hardened asphalt. In addition, as shown in FIG. 5, the method 500 comprises a step 508 of obtaining at least one polymer, a step 510 of mixing the at least one polymer with the hardened asphalt, so as to form a PMA, a step 512 of obtaining at least one filler, and a step 514 of mixing the at least one filler with the PMA, so as to form a filled coating. The method 500 further comprises a step 516 of obtaining a roofing substrate and a step 518 of applying the filled coating to the roofing substrate, so as to form a roofing shingle.

Non-Limiting Examples

Example 1: Asphalt having a softening point of 126° F. when tested according to ASTM D3461, a viscosity of 42 cP when tested at 400° F. according to ASTM D4402, and a penetration of 63 dmm when tested at 77° F. according to ASTM 3462 was mixed with coumarone indene resin (CIR), so as to form hardened asphalt using the method 100 depicted in FIG. 1. The results are presented in Table 1.

TABLE 1

| Asphalt % | CIR % | Softening Point (° F.) | Viscosity at 400° F. (cP) | Penetration at 77° F. (dmm) |
|---|---|---|---|---|
| 100 | 0 | 126 | 42 | 63 |
| 96 | 4 | 131 | 44 | 42 |
| 93 | 7 | 134 | 46 | 36 |
| 92 | 8 | 145 | 52 | 24 |

As shown in Table 1, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 2: Asphalt having a softening point of 113° F. when tested according to ASTM D3461, a viscosity of 32 cP when tested at 400° F. according to ASTM D4402, and a penetration of 112 dmm was mixed with CIR, so as to form hardened asphalt using the method 100 depicted in FIG. 1. The results are presented in Table 2.

TABLE 2

| Asphalt % | CIR % | Softening Point (° F.) | Viscosity at 400° F. (cP) | Penetration at 77° F. (dmm) |
|---|---|---|---|---|
| 100 | 0 | 113 | 32 | 112 |
| 92.5 | 7.5 | 125 | 31 | 48 |
| 85 | 15 | 133 | 31 | 28 |

As shown in Table 2, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 3: An asphalt mixture was formed of (a) 70% asphalt having a softening point of 103° F. when tested according to ASTM D3461, a viscosity of 10 cP when tested at 400° F. according to ASTM D4402, and a penetration of 219 dmm when tested at 77° F. according to ASTM 3462 and (b) 30% asphalt having a softening point of 177° F. when tested according to ASTM D3461, a viscosity of 123 cP when tested at 400° F. according to ASTM D4402, and a penetration of 2.3 dmm when tested at 77° F. according to ASTM 3462. The asphalt mixture had a softening point of 125° F. when tested according to ASTM D3461, a viscosity of 33 cP when tested at 400° F. according to ASTM D4402, and a penetration of 49 dmm when tested at 77° F. according to ASTM 3462. The asphalt mixture was mixed with CIR, so as to form hardened asphalt using the method 100 depicted in FIG. 1. The results are presented in Table 3.

TABLE 3

| Asphalt % | CIR % | Softening Point (° F.) | Viscosity at 400° F. (cP) | Penetration at 77° F. (dmm) |
|---|---|---|---|---|
| 100 | 0 | 125 | 33 | 49 |
| 97 | 3 | 130 | 36 | 38 |
| 95 | 5 | 133 | 38 | 30 |

As shown in Table 3, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 4: An asphalt mixture was formed of (a) 60% asphalt having a softening point of 103° F. when tested according to ASTM D3461, a viscosity of 10 cP when tested at 400° F. according to ASTM D4402, and a penetration of 219 dmm when tested at 77° F. according to ASTM 3462 and (b) 40% asphalt having a softening point of 177° F. when tested according to ASTM D3461, a viscosity of 123 cP when tested at 400° F. according to ASTM D4402, and a penetration of 2.3 dmm when tested at 77° F. according to ASTM 3462. The asphalt mixture had a softening point of 131° F. when tested according to ASTM D3461, a viscosity of 43 cP when tested at 400° F. according to ASTM D4402, and a penetration of 34 dmm when tested at 77° F. according to ASTM 3462. The asphalt mixture was mixed with CIR, so as to form hardened asphalt using the method 100 depicted in FIG. 1. The results are presented in Table 4.

TABLE 4

| Asphalt % | CIR % | Softening Point (° F.) | Viscosity at 400° F. (cP) | Penetration at 77° F. (dmm) |
|---|---|---|---|---|
| 100 | 0 | 131 | 43 | 34 |
| 97 | 3 | 135 | 47 | 27 |

As shown in Table 4, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 5: Asphalt having a softening point of 126° F. when tested according to ASTM D3461, a viscosity of 42 cP when tested at 400° F. according to ASTM D4402, and a penetration of 63 dmm when tested at 77° F. according to ASTM 3462 was mixed with CIR and at least one polymer (i.e., ethylene vinyl acetate copolymer (EVA), styrene-butadiene-styrene block copolymer (SBS), and polyaminoamide wax (PAA)), so as to form hardened asphalt using the method 300 depicted in FIG. 3. The results are presented in Table 5.

TABLE 5

| Asphalt % | CIR % | HTT Resin % | PAA WAX % | EVA % | SBS % | Softening Point (° F.) | Viscosity at 400° F. (cP) | Penetration at 77° F. (dmm) |
|---|---|---|---|---|---|---|---|---|
| 86 | 7 | 0 | 0 | 0 | 7 | 219 | 423 | 27.3 |
| 86 | 7 | 0 | 0 | 0 | 7 | 229 | 381 | 26 |
| 79.25 | 4 | 7 | 3.25 | 6 | 0 | 234 | 210 | 18 |

As shown in Table 5, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 6: Asphalt having a softening point of 113° F. when tested according to ASTM D3461, a viscosity of 32 cP when tested at 400° F. according to ASTM D4402, and a penetration of 112 dmm when tested at 77° F. according to ASTM 3462 was mixed with CIR and at least one polymer, so as to form hardened asphalt using the method 300 depicted in FIG. 3. The results are presented in Table 6.

TABLE 6

| Asphalt % | CIR % | HTT Resin % | PAA WAX % | EVA % | SBS % | Softening Point (° F.) | Viscosity at 400° F. (cP) | Penetration at 77° F. (dmm) |
|---|---|---|---|---|---|---|---|---|
| 94 | 0 | 0 | 0 | 0 | 6 | 203 | 182 | 51 |
| 87 | 7 | 0 | 0 | 0 | 6 | 209 | 339 | 36 |
| 80 | 14 | 0 | 0 | 0 | 6 | 216 | 343 | 25 |
| 74.5 | 6 | 7.5 | 3.5 | 8.5 | 0 | 236 | 225 | 25 |

As shown in Table 6, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 7: An asphalt mixture was formed of (a) 70% asphalt having a softening point of 103° F. when tested according to ASTM D3461, a viscosity of 10 cP when tested at 400° F. according to ASTM D4402, and a penetration of 219 dmm when tested at 77° F. according to ASTM 3462 and (b) 30% asphalt having a softening point of 177° F. when tested according to ASTM D3461, a viscosity of 123 cP when tested at 400° F. according to ASTM D4402, and a penetration of 2.3 dmm when tested at 77° F. according to ASTM 3462. The asphalt mixture had a softening point of 125° F. when tested according to ASTM D3461, a viscosity of 33 cP when tested at 400° F. according to ASTM D4402, and a penetration of 49 dmm when tested at 77° F. according to ASTM 3462. The asphalt mixture was mixed with CIR and at least one polymer, so as to form hardened asphalt using the method 300 depicted in FIG. 3. The results are presented in Table 7.

TABLE 7

| Asphalt % | CIR % | HTT Resin % | PAA WAX % | EVA % | SBS % | Softening Point (° F.) | Viscosity at 400° F. (cP) | Penetration at 77° F. (dmm) |
|---|---|---|---|---|---|---|---|---|
| 85 | 3 | 0 | 3 | 9 | 0 | 259 | 210 | 24 |

As shown in Table 7, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 8: An asphalt mixture was formed of (a) 60% asphalt having a softening point of 103° F. when tested according to ASTM D3461, a viscosity of 10 cP when tested at 400° F. according to ASTM D4402, and a penetration of 219 dmm when tested at 77° F. according to ASTM 3462 and (b) 40% asphalt having a softening point of 177° F. when tested according to ASTM D3461, a viscosity of 123 cP when tested at 400° F. according to ASTM D4402, and a penetration of 2.3 dmm when tested at 77° F. according to ASTM 3462. The asphalt mixture had a softening point of 131° F. when tested according to ASTM D3461, a viscosity of 43 cP when tested at 400° F. according to ASTM D4402, and a penetration of 34 dmm when tested at 77° F. according to ASTM 3462. The asphalt mixture was mixed with CIR and at least one polymer, so as to form hardened asphalt using the method 300 depicted in FIG. 3. The results are presented in Table 8.

TABLE 8

| Asphalt % | CIR % | HTT Resin % | PAA WAX % | EVA % | SBS % | Softening Point (° F.) | Viscosity at 400° F. (cP) | Penetration at 77° F. (dmm) |
|---|---|---|---|---|---|---|---|---|
| 85 | 3 | 0 | 3 | 9 | 0 | 258 | 226 | 21 |

As shown in Table 8, the hardened asphalt shows favorable properties relative to the asphalt alone, such as a higher softening point when tested according to ASTM D3461, a higher viscosity when tested at 400° F. according to ASTM D4402, and a lower penetration point when at 77° F. according to ASTM 3462 than the starting asphalt.

Example 9: Asphalt having a softening point of 126° F. when tested according to ASTM D3461, a viscosity of 42 cP when tested at 400° F. according to ASTM D4402, and a penetration of 63 dmm when at 77° F. according to ASTM 3462 was mixed with alpha methyl polystyrene and at least one polymer, so as to form hardened asphalt using the method 300 depicted in FIG. 3. The results are presented in Table 9.

TABLE 9

| Asphalt % | Alpha Methyl Polystyrene % | Recycled Polystyrene % | SBS % | Softening Point (° F.) | Viscosity at 400° F. (cP) | Penetration at 77° F. (dmm) |
|---|---|---|---|---|---|---|
| 0 | 82.5 | 17.5 | 0 | 284 | 6554 | 1.3 |
| 77 | 14.5 | 3 | 5.5 | 229 | 381 | 26 |

As shown in Table 9, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Example 10: Asphalt having a softening point of 110° F. when tested according to ASTM D3461, a viscosity of 24 cP when tested at 400° F. according to ASTM D4402, and a penetration of 155 dmm when tested at 77° F. according to ASTM 3462 was mixed with a maleic-modified glycerine ester of tall oil resin and at least one polymer, so as to form hardened asphalt using the method 300 depicted in FIG. 3. The results are presented in Table 10.

TABLE 10

| Asphalt % | Tall Oil Resin % | SBS % | Softening Point (° F.) | Viscosity at 400° F. (cP) | Penetration at 77° F. (dmm) |
|---|---|---|---|---|---|
| 100 | 0 | 0 | 110 | 24 | 155 |
| 89.75 | 10.25 | 0 | 134 | 29 | 26 |
| 83 | 10 | 7 | 209 | 248 | 22 |

As shown in Table 10, the hardened asphalt shows favorable properties relative to the asphalt alone, such as a higher softening point when tested according to ASTM D3461, a higher viscosity when tested at 400° F. according to ASTM D4402, and a lower penetration point when tested at 77° F. according to ASTM 3462 than the starting asphalt.

Variations, modifications, and alterations to embodiments of the disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A method comprising:
obtaining asphalt;
wherein the asphalt has a softening point of 100° F. to 200° F. as measured according to ASTM D3461;
obtaining at least one hardening agent;
wherein the at least one hardening agent has a softening point of 150° F. to 300° F. as measured according to ASTM D3461;
mixing the at least one hardening agent with the asphalt, so as to form a hardened asphalt;
wherein the at least one hardening agent is mixed with the asphalt in a weight ratio of 1:100 to 1:2, and
wherein the hardened asphalt has (i) a softening point that is greater than the softening point of the asphalt and (ii) a viscosity that is greater than a viscosity of the asphalt when tested at 400° F.;
obtaining at least one polymer;
mixing the at least one polymer with the hardened asphalt, so as to form a polymer modified asphalt (PMA);
wherein the at least one polymer is mixed with the hardened asphalt in a weight ratio of 1:100 to 1:5, and
wherein the PMA has a softening point that is greater than the softening point of the asphalt;
obtaining at least one filler;
wherein the at least one filler comprises at least one of limestone, glass, calcium carbonate, barium sulfate, calcium sulfate, talc, perlite, silica, quartz, aluminum trihydrate, magnesium hydroxide, ammonium polyphosphate, colemanite, titanium dioxide, fly ash, graphene nanoparticles, carbon black, basalt, roofing granules, graphite, clay, or any combination thereof;
mixing the at least one filler with the PMA, so as to form a filled coating,
wherein the filled coating comprises (i) 10% to 70% by weight of the at least one filler based on a total weight of the filled coating, and (ii) 30% to 90% by weight of the PMA based on the total weight of the filled coating, and
wherein the filled coating has a thickness of 20 mil to 200 mil;
obtaining a roofing substrate; and
applying the filled coating to the roofing substrate, so as to form a roofing shingle.

2. The method of claim 1, wherein the asphalt comprises virgin asphalt.

3. The method of claim 1, wherein the hardened asphalt has a softening point of 125° F. to 250° F. as measured according to ASTM D3461.

4. The method of claim 1, wherein the at least one hardening agent comprises at least one of a rosin ester resin, a tall oil resin, any derivative thereof, or any combination thereof.

5. The method of claim 1, wherein the PMA has a softening point of 200° F. to 300° F. as measured according to ASTM D3461.

6. The method of claim 1, wherein the at least one polymer comprises at least one of polystyrene, a styrenic block copolymer, silicone, silicone polyester resin, ethylene vinyl acetate copolymer, or any combination thereof.

7. The method of claim 1, wherein the method does not comprise an oxidation step.

8. A method comprising:
obtaining asphalt;
wherein the asphalt has a softening point of 100° F. to 200° F. as measured according to ASTM D3461;
obtaining at least one hardening agent;
wherein the at least one hardening agent has a softening point of 150° F. to 300° F. as measured according to ASTM D3461;
mixing the at least one hardening agent with the asphalt, so as to form hardened asphalt;
wherein the at least one hardening agent is mixed with the asphalt in a weight ratio of 1:100 to 1:2, and
wherein the hardened asphalt has a softening point that is greater than the softening point of the asphalt;
obtaining at least one polymer;
mixing the at least one polymer with the hardened asphalt, so as to form a polymer modified asphalt (PMA);
wherein the at least one polymer is mixed with the hardened asphalt in a weight ratio of 1:100 to 1:5,
wherein the PMA has a softening point that is greater than the softening point of the asphalt, and
wherein the PMA does not comprise a plasticizer;
obtaining at least one filler;
wherein the at least one filler comprises at least one of limestone, glass, calcium carbonate, barium sulfate, calcium sulfate, talc, perlite, silica, quartz, aluminum trihydrate, magnesium hydroxide, ammonium polyphosphate, colemanite, titanium dioxide, fly ash, graphene nanoparticles, carbon black, basalt, roofing granules, graphite, clay, or any combination thereof; and
mixing the at least one filler with the PMA, so as to form a filled coating;
wherein the filled coating comprises (i) 10% to 70% by weight of the at least one filler based on a total weight of the filled coating, and (ii) 30% to 90% by weight of the PMA based on the total weight of the filled coating,
wherein the filled coating has a thickness of 20 mil to 200 mil,
wherein the filled coating is configured to be applied to a roof substrate to obtain a roofing shingle; and
wherein the method does not comprise an oxidation step.

9. The method of claim 8, wherein the asphalt comprises virgin asphalt.

10. The method of claim 8, wherein the hardened asphalt has a softening point of 125° F. to 250° F. as measured according to ASTM D3461.

11. The method of claim 8, wherein the at least one hardening agent comprises at least one of a rosin ester resin, a tall oil resin, any derivative thereof, or any combination thereof.

12. The method of claim 8, wherein the PMA has a softening point of 200° F. to 300° F. as measured according to ASTM D3461.

13. The method of claim 8, wherein the at least one polymer comprises at least one of polystyrene, a styrenic block copolymer, silicone, silicone polyester resin, ethylene vinyl acetate copolymer, or any combination thereof.

14. The method of claim 8, wherein the hardened asphalt has a viscosity that is greater than a viscosity of the asphalt when tested at 400° F.

15. A method comprising:
obtaining asphalt;
wherein the asphalt has a softening point of 100° F. to 200° F. as measured according to ASTM D3461;

obtaining at least one hardening agent;
wherein the at least one hardening agent has a softening point of 150° F. to 300° F. as measured according to ASTM D3461;
mixing the at least one hardening agent with the asphalt, so as to form hardened asphalt;
wherein the at least one hardening agent is mixed with the asphalt in a weight ratio of 1:100 to 1:2, and
wherein the hardened asphalt has (i) a softening point that is greater than the softening point of the asphalt and (ii) a viscosity that is greater than a viscosity of the asphalt when tested at 400° F.;
obtaining at least one polymer;
mixing the at least one polymer with the hardened asphalt, so as to form a polymer modified asphalt (PMA);
wherein the at least one polymer is mixed with the hardened asphalt in a weight ratio of 1:100 to 1:5, and
wherein the PMA has a softening point that is greater than the softening point of the asphalt;
obtaining at least one filler;
wherein the at least one filler comprises at least one of limestone, glass, calcium carbonate, barium sulfate, calcium sulfate, talc, perlite, silica, quartz, aluminum trihydrate, magnesium hydroxide, ammonium polyphosphate, colemanite, titanium dioxide, fly ash, graphene nanoparticles, carbon black, basalt, roofing granules, graphite, clay, or any combination thereof; and
mixing the at least one filler with the PMA, so as to form a filled coating;
wherein the filled coating comprises (i) 10% to 70% by weight of the at least one filler based on a total weight of the filled coating, and (ii) 30% to 90% by weight of the PMA based on the total weight of the filled coating,
wherein the filled coating has a thickness of 20 mil to 200 mil, and
wherein the filled coating is configured to be applied to a roof substrate to obtain a roofing shingle.

16. The method of claim 15, wherein the asphalt comprises virgin asphalt.

17. The method of claim 15, wherein the hardened asphalt has a softening point of 125° F. to 250° F. as measured according to ASTM D3461.

18. The method of claim 15, wherein the at least one hardening agent comprises at least one of a rosin ester resin, a tall oil resin, any derivative thereof, or any combination thereof.

19. The method of claim 15, wherein the PMA has a softening point of 200° F. to 300° F. as measured according to ASTM D3461.

20. The method of claim 15, wherein the method does not comprise an oxidation step.

* * * * *